Dec. 16, 1969   A. H. McILRAITH   3,484,602
CHARGED PARTICLE ANALYZER USING A CHARGED
PARTICLE TRANSIT TIME OSCILLATOR
Filed May 13, 1966   5 Sheets-Sheet 1
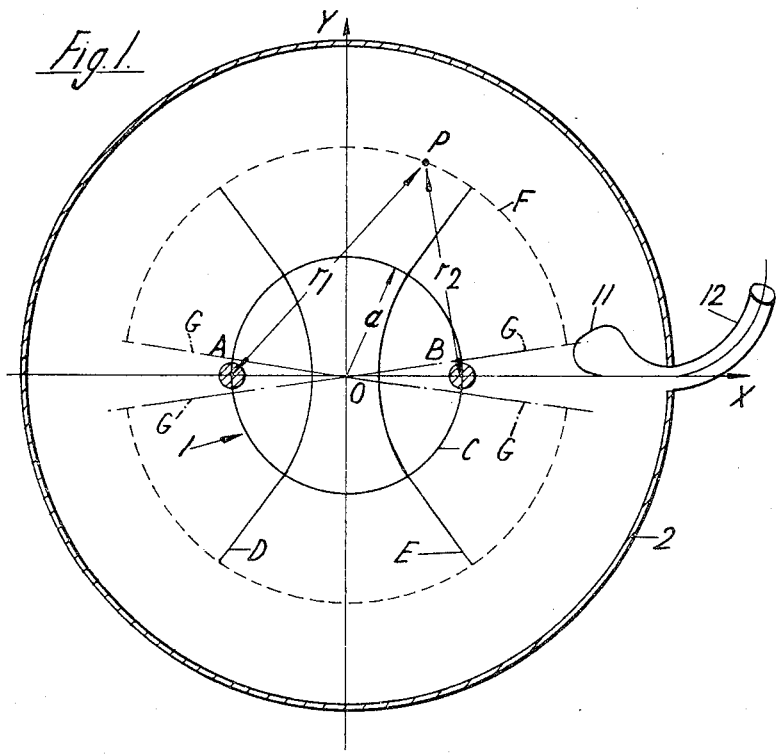
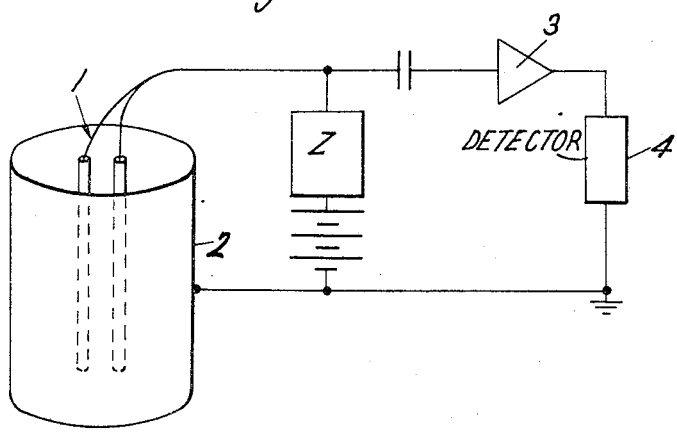
Inventor
Arthur Hamilton McIlraith
By Cushman, Darby & Cushman
Attorneys

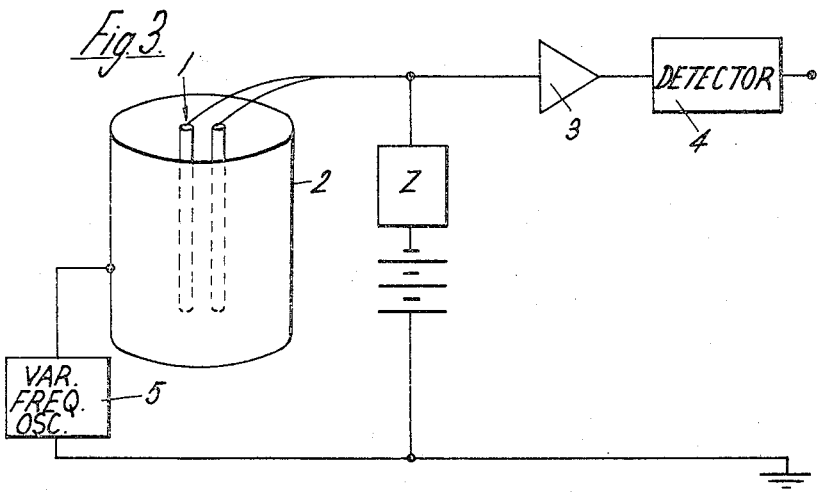
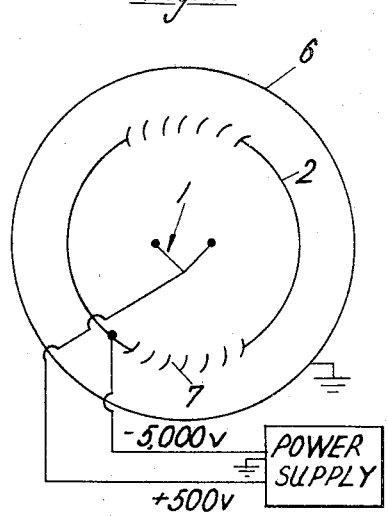
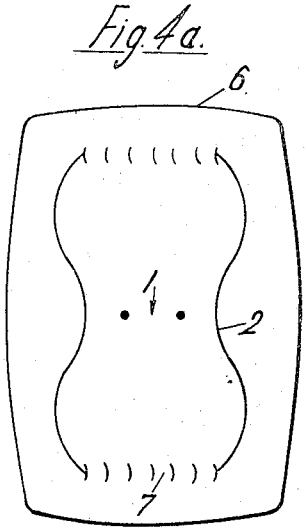

Dec. 16, 1969  A. H. McILRAITH  3,484,602
CHARGED PARTICLE ANALYZER USING A CHARGED
PARTICLE TRANSIT TIME OSCILLATOR
Filed May 13, 1966  5 Sheets-Sheet 3
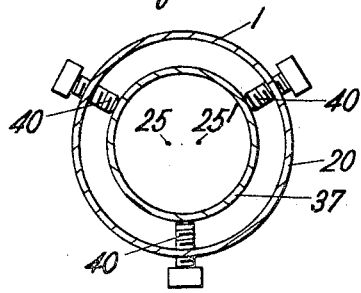
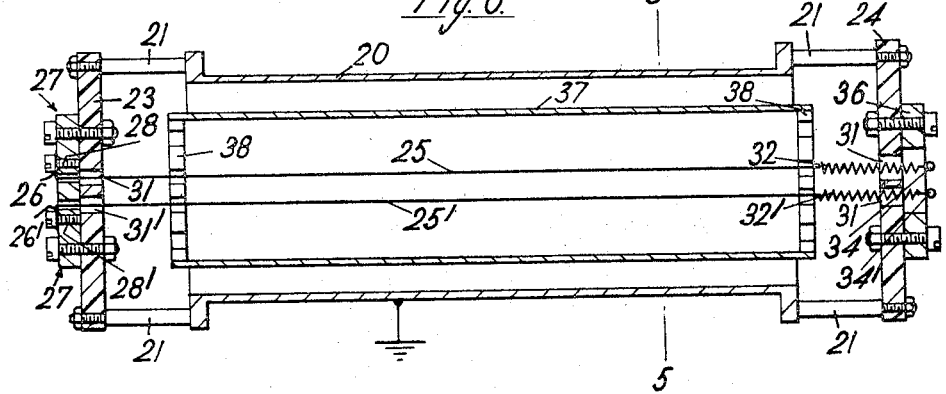
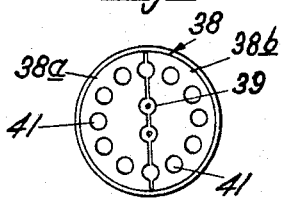 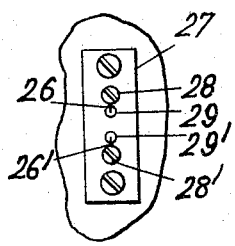 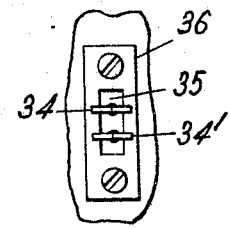
Inventor
Arthur Hamilton McIlraith
By Cushman, Darby & Cushman
Attorneys United States Patent Office 3,484,602
Patented Dec. 16, 1969

3,484,602
CHARGED PARTICLE ANALYZER USING A CHARGED PARTICLE TRANSIT TIME OSCILLATOR
Arthur Hamilton McIlraith, Teddington, Middlesex, England, assignor to National Research Development Corporation, London, England, a corporation of Great Britain
Filed May 13, 1966, Ser. No. 549,957
Claims priority, application Great Britain, May 14, 1965, 20,592/65
Int. Cl. H01j 39/34
U.S. Cl. 250—41.9                                 23 Claims

ABSTRACT OF THE DISCLOSURE

A charged particle transit time oscillator has a vacuum chamber, an outer electrode in the chamber and a pair of spaced conductors mounted within the outer electrode and surrounded thereby. An injector is placed inside the outer electrode for introducing electrons into the oscillator and a probe is also placed inside the outer electrode for detecting electrical oscillations of the charged particles. In operation, an electrostatic potential is given to the pair of conductors, the potential having a polarity with respect to the outer electrodes opposite to the polarity of the electrons. Thus the oscillator is provided with a solely electrostatic field which has a pronounced single saddle configuration so that electrons in the chamber follow stable paths of oscillatory movement through the saddle configuration.

---

This invention relates to oscillation generators, and more particularly to oscillation generators of the charged particle transit time type, that is, to oscillation generators of the type in which oscillations are generated by virtue of the oscillatory movements of charged particles in an electrostatic field.

A well-known example of a charged particle transit time oscillator is the so-called Barkhausen-Kurz or Gill-Morell positive grid thermionic valve oscillator, in which oscillations are generated by virtue of oscillatory movements of electrons relative to a grid consisting of a number of parallel wires disposed in a plane between a pair of parallel electrodes. After performing a number of oscillations between the wires of the grid, an electron strikes the grid and is absorbed thereby. The frequency of oscillation in a circuit connected to the grid is the frequency of the electron transits through the grid. Since, however, each electron performs a strictly limited number of transits before striking the grid, the oscillations are necessarily unstable.

The present invention seeks to provide improved oscillation generators of the type referred to, wherein very stable charged particle oscillations are obtainable, so that very long time constants and consequently high values of Q are readily obtainable. For the purposes of this specification, the Q value of a resonant system is defined as:

$$Q = \frac{\text{resonant angular frequency} \times \text{stored energy}}{\text{rate of energy dissipation at resonance}}$$

According to this invention, a charged particle transit time oscillator comprises a low pressure or vacuum chamber containing an outer electrode which surrounds an electrode system, said electrode system, when electric potentials are applied thereto, providing an electrostatic field which has a pronounced single saddle configuration such that in operation charged particles in said chamber follow stable paths of oscillatory movement through said saddle configuration.

The charged particles may be of any nature, notably electrons or positive or negative ions.

The electrode system is preferably such that the electrostatic field lines are directed substantially radially towards the centre of the saddle configuration at positions beyond a relatively short distance therefrom.

An electrode system according to a preferred embodiment of the invention comprises a pair of spaced parallel conductors, or a pair of spaced spherical conductors, with a common electrostatic potential applied thereto, said potential having a polarity with respect to the outer electrode opposite to the polarity of the charged particles. Thus, if the said particles are electrons, the electrostatic potential will be positive; if the particles are positive ions, said potential will be negative. The electrode system according to this embodiment will produce an electrostatic field distribution with a single saddle configuration disposed symmetrically between the parallel conductors or spherical conductors as the case may be.

Another simple form of electrode system comprises a single annular conductor maintained at a suitable electrostatic potential, positive or negative with respect to the outer electrode as the case may be. The electrostatic field distribution in this case has a single saddle configuration at the point of intersection of the axis of symmetry of the annular conductor with the plane thereof.

With each of the electrode systems referred to above, the electrostatic field lines become substantially radial with respect to the centre of the saddle configuration at a relatively short distance therefrom.

Preferably, the said electrode system is centrally disposed within said outer electrode. Preferably, also, the said outer electrode is spaced from the electrode system by a distance which is large compared with the distance of the centre of the saddle configuration from the electrode system.

The shape of the outer electrode may take any of a variety of different forms, depending on the application. The shape of the outer electrode is preferably spherical when the electrode system comprises two spaced spherical conductors or a single annular conductor, and is preferably cylindrical when the electrode system comprises a pair of spaced parallel conductors. The shape of the outer electrode in general is preferably such that it conforms to an equi-potential surface of the electrostatic field which would exist were the electrode system charged and remote from all other objects. Where a cylindrical outer electrode is employed, the ends thereof may be closed by respective conductive end plates which are held at a constant potential of the same polarity as the polarity of the charged particles. The outer electrode may, if desired, be divided into two or more equal segments which are electrically insulated from each other.

Where the oscillator is required to produce an electrical oscillatory output this may be extracted by any suitable known means, for example, by a probe inserted into a suitable point in the field in the said space, or by means of an electrical connection with the said electrode system.

The invention has numerous applications other than the production of an electrical oscillatory output. Thus, for example, a highly sensitive gauge for measuring very low pressures can be made by connecting the space containing the electrostatic field of the oscillator to a chamber in which the pressure is to be measured and ascertaining the pressure in terms of the decay time of the oscillations or in terms of the ion current produced in said space by the collision of the charged oscillating particles with neutral atoms or molecules in the space.

One vacuum gauge of this nature comprises a cylindrical outer electrode within which an electrode system comprising two parallel conductors is disposed centrally, said conductors being located close to and parallel to the axis of said electrode, means applying a positive potential to the electrode system relative to the said outer electrode, means for amplifying the voltage produced across an impedance connected between said electrode system and earth and detector means for detecting the output of said amplifier means to ascertain the degree of vacuum in the space between the outer electrode and the electrode system. An arrangement of a cylindrical outer electrode and an electrode system comprising two parallel conductors disposed within the same, similar to that referred to above, may also be employed as a mass spectrometer by applying an alternating voltage of variable frequency between the outer electrode and earth, amplifying and detecting the voltage set up across an impedance connected between the electrode system and earth, and noting the value of the superimposed frequency at which maximum detected output is obtained. Alternatively the said frequency could be kept constant and the applied voltage varied, the value of said voltage at which maximum detected output occurs being noted.

The invention may also be used to provide a vacuum pump by connecting the inter-electrode space of the oscillator to the space to be evacuated, and arranging for a large number of collisions by transit time oscillations of electrons with atoms or molecules in said space to occur, the ions resulting from such collisions being collected on a getter electrode system. In one form of such a pump, there is an outer cylindrical electrode provided with openings and having at least its external surface of getter material. The outer electrode is enclosed within a collector electrode, also of getter material. The arrangement is such that when the outer electrode is maintained at a high negative voltage with respect to the collector electrode and the electrode system is maintained at a suitable positive potential, some of the resulting ions impinge upon the outer electrode to produce a sputter of getter material which assists in the capture of ions which have passed through the openings of the outer electrode and have struck the collector electrode.

Although the oscillator in accordance with this invention is basically a random oscillator or noise generator, it can be operated as a coherent oscillator by providing feedback in the well-known manner. Thus, for example, in an oscillator employing a divided cylindrical outer electrode, surrounding a centrally disposed inner electrode system comprising a pair of spaced parallel conductors parallel to the axis of the outer electrode, the potential produced on one of the halves of the outer electrode being amplified by a tuned amplifier and applied between one of the portions of the outer electrode and the inner electrode system in correct phase to produce the required feedback for coherent oscillations to occur.

The invention and some applications thereof will be described, by way of example only, with reference to the accompanying drawings, in which:

FIGURE 1 is a diagrammatic cross section of an oscillation generator illustrating the principle of the invention;

FIGURE 2 is a diagrammatic representation of a vacuum gauge illustrating one application of the invention;

FIGURE 3 is a diagrammatic representation of a mass spectrometer according to another application of the invention;

FIGURES 4 and 4a illustrate the principle of a vacuum pump as a further application of the invention;

FIGURE 5 is a transverse cross section, on the line 5—5 of FIGURE 6, of a practical embodiment of a vacuum pump incorporating the invention;

FIGURE 6 is an axial section through said pump;

FIGURE 7 is a plan view of a closure disc 38 forming part of the pump of FIGURES 5 and 6;

FIGURE 8 is a plan view of a part of said pump, indicated by arrow 27 in FIGURE 6;

FIGURE 9 is a plan view of a further part of said pump, indicated by arrow 36 in FIGURE 6;

Figure 12:
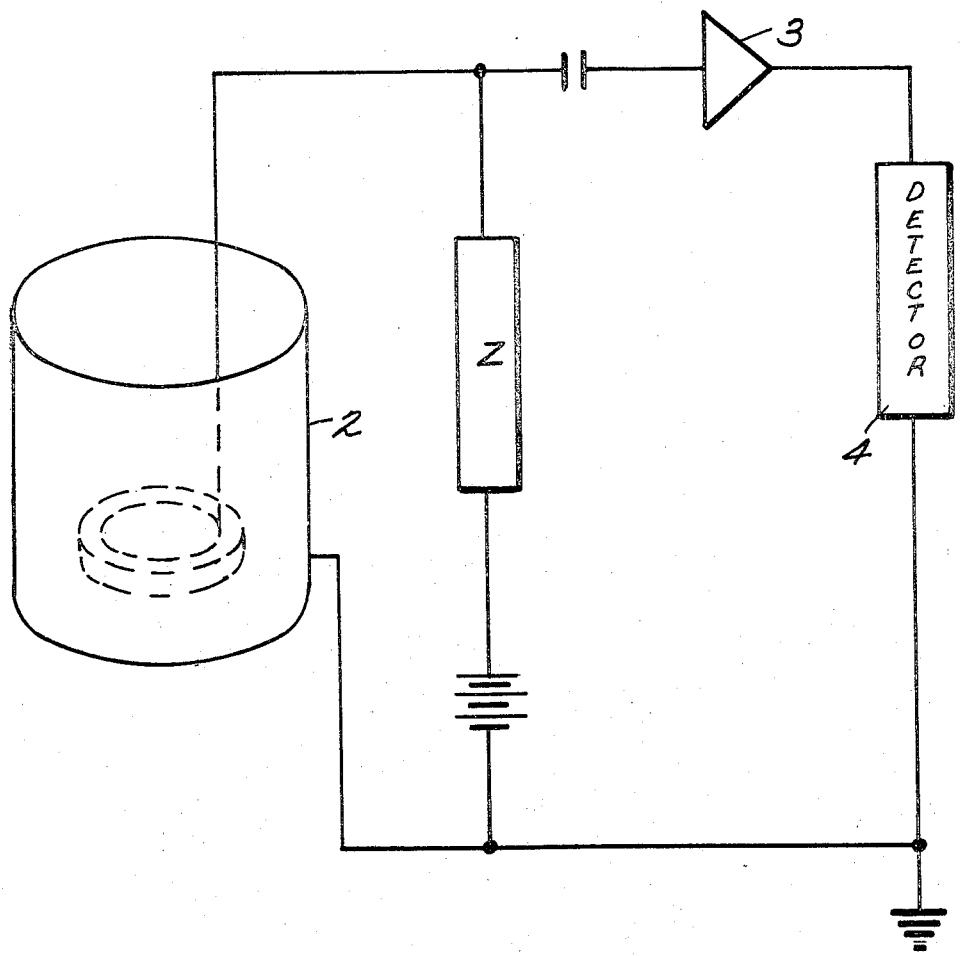
FIGURE 12 is a diagrammatic representation of a vacuum gauge according to a further embodiment of the invention.

The principle of the present invention is to accelerate charged particles in an electrostatic field and to cause the particles to oscillate freely about a saddle configuration in the field. It is essential that the electrostatic field have a pronounced single saddle configuration if there are to be any stable oscillatory paths for the charged particles. Various electrode systems may be employed to produce the required field distribution. As illustrated in FIGURE 1 the electrostatic field is produced by an electrode system 1 comprising two spaced apart parallel cylindrical conductors A, B, each maintained at the same constant potential. Alternatively the electrode system 1 could, for example, comprise a single annular conductor (FIGURE 12) or two spaced apart spherical conductors.

An elementary analysis of the electrostatic field due to the conductors A, B is possible if it be assumed that the conductors A and B have negligible thickness and are infinitely long. For the sake of convenience the midpoint O between A and B will be taken as the origin of cartesian coordinates, the axes OX, OY of which are respectively parallel to and perpendicular to the line joining A, B. If each conductor A, B has the same charge $q$, per unit length, then the potential $V_p$ at a point P $(x, y)$ distant $r_1$ and $r_2$ from A, B respectively is $-2q \log r_1$ due to conductor A and $-2q \log r_2$ due to conductor B. That is, $V_p = -2q (\log r_1 + \log r_2)$. If the separation of the conductors A, B is $2a$, then the potential at the origin O is $V_O = -4q \log a$. Thus the potential at P relative to that at the origin O is:

$$V_{OP} = -2q(\log r_1 + \log r_2) + 4q \log a$$
$$= q \log \frac{a^4}{r_1^2 r_2^2}$$

Putting $r_1^2 = y^2 + (x+a)^2$ and $r_2^2 = y^2 + (x-a)^2$ and differentiating with respect to $x$ and $y$ in turn to obtain the electrostatic field components $E_x$, $E_y$ respectively, we have:

$$E_x = -\frac{dV_{OP}}{dx}; E_y = -\frac{dV_{OP}}{dy}$$

$$E_x = 4qx(x^2+y^2-a^2)/r_1^2 r_2^2 \quad (1)$$

$$E_y = 4qy(x^2+y^2+a^2)/r_1^2 r_2^2 \quad (2)$$

At the origin O both $E_x$ and $E_y$ are zero. The origin O is therefore a saddle point in the potential field.

Furthermore, from Equation 1 it will be seen that $E_x$ is also zero when $x^2+y^2-a^2=0$, that is on a circle C of radius $a$ with its centre at the origin O; this is the circle on AB as diameter. Within this circle $(x^2+y^2 < a^2)$ the electrostatic field component $E_x$ is positive for $x > 0$ and negative for $x < 0$, while without this circle $(x^2+y^2 > a^2)$ the electrostatic field component $E_x$ is negative for $x > 0$ and positive for $x < 0$. That is to say, if a negatively charged particle such as an electron enters the electrostatic field the force $F_x$ exerted thereon parallel to the axis OX will be directed towards the axis OY outside the circle C but will be directed away from the axis OY inside the said circle C. The force $F_y$ on the electron parallel to the axis OY is always directed to the axis OX since the term $(x^2+y^2+a^2)$ in Equation 2 is positive for all coordinates $(x, y)$.

It will be appreciated that the above analysis is also applicable to positively charged particles, such as positive ions, if the potential on the conductors A, B is negative.

Referring again to the Equations 1 and 2 the inclination $\psi$ of the electrostatic field to the axis OX is given by $$\tan \psi = \frac{E_y}{E_x} = \frac{y}{x} \cdot \frac{x^2+y^2+a^2}{x^2+y^2-a^2}.$$

That is, $\tan \psi = \frac{y}{x}$ for $x^2+y^2 \gg a^2$.

Thus the electrostatic field at distances from the saddle point O which are large compared with the separation of the conductors A, B is directed substantially radially from the saddle point O; the electrostatic field ceases to be substantially radial only at radial distances of the order of $a$ (the radius of circle C) and less from the saddle point O. It follows, therefore, that if an electron were released at rest from a point P whose distance from the saddle point O is large compared with the separation of the electrode conductors A, B, then the electron will begin to move radially towards the saddle point at the origin O.

As the electron approaches the saddle point, however, it is deflected away from this radial path by virtue of the increasing asymmetry of the forces exerted on the electron by the two conductors A, B. It follows that there are electron trajectories which cross the axis OX at right angles thereto; since the electrostatic field is symmetrical about the axis OX these electron trajectories follow paths on each side of the axis OX which are mirror images of each other and which are, therefore, stable paths for electron oscillations. Two such trajectories D, E are illustrated in FIGURE 1.

Electron trajectories with starting positions between the trajectories D, E are in general more complicated. It can be shown that if the starting position P of the electron has coordinates $(p, q)$, then the subsequent trajectories of the electron all lie within the rectangle defined by the coordinates: $(p, q)$; $(p, -q)$; $(-p, -q)$ and $(-p, q)$. That is, these electron trajectories do not cut the trajectories D, E and are stable.

The broken line F represents the locus of starting positions P for electrons in order for the trajectories thereof to be stable ones, such as D and E. The boundary of the space in which stable trajectories can occur with conductors A, B of finite size is indicated by the substantially radial lines G (chain dotted) which are tangential to conductors A, B.

In order to accelerate the charged particles towards the saddle point O of the electrostatic field the electrode system 1 is mounted centrally in an evacuated space and is surrounded by an outer electrode 2 which is maintained at a potential with respect to the outer electrode of the same polarity as that of the charged particles—that is, a negative potential where the charged particles are electrons. The electrode system 1 is arranged symmetrically with respect to the axis of the outer electrode 2 and the outer electrode 2 is spaced from the electrode system 1 by a distance which is large compared with the distance of the saddle point O from either of the conductors A, B of the electrode system 1. An electron which begins its trajectory near the outer electrode 2 therefore acquires a high momentum by the time it enters the inter-electrode space of the electrode system 1, as defined by the circle C. Deflection of the electron from its initial radially directed path is consequently slight, and the electron can therefore more easily adopt a stable oscillatory path as described above.

The shape of the outer electrode 2 is dependent on the application for which the apparatus is to be used, and is dictated by two requirements: ($a$) the need for a wide range of starting positions for stable trajectories and ($b$) the need for pure simple harmonic motion of the charged particles. In the embodiment of FIGURE 1 the outer electrode 2 is in the form of a hollow cylinder the axis of which coincides with the saddle point O of the electrostatic field.

The cylindrical outer electrode 2 need not necessarily be circular in cross section as illustrated in FIGURE 1, but may be formed so as to coincide with an equipotential surface of the electrostatic field which would exist were the electrode system 1 charged and remote from all other objects. In this case the electrostatic field with the outer electrode 2 in place is similar to that which would be obtained if the electrode system 1 were charged and remote from all other objects whereby there were no external disturbing influences on the field distribution.

A probe device 11 is inserted at a suitable point in the evacuated space between the electrodes to extract an electrical oscillatory output therefrom at the frequency of the charged particle oscillations. The probe device 11 as shown is of the magnetic type comprising a loop one end of which is connected to the wall of the outer electrode 2 and the other end of which is connected to the central conductor of a coaxial output lead 12. Alternatively, the output may be taken from an electrical connection with the electrode system 1.

Where the charged particles are electrons they may be introduced into the space containing the electrostatic field from any suitable electron source, such as, for example, one or more thermionic cathodes (not shown) or electron guns, or by photo-electric emission of electrons from the material of the outer electrode 2. Alternatively, advantage may be taken of electrons present in the residual gas due to irradiation, for example by cosmic rays.

An approximate estimate of the frequency of oscillation of the charged particles can be made by assuming a potential distribution between the saddle point O and the starting point of the oscillations such that the motion of the charged particles is simple harmonic about the saddle point O. The frequency of oscillation $f$ for a particle of charge $e$ and mass $m$ is then:

$$f = \frac{1}{2\pi y_0} \cdot \sqrt{\frac{2eV_0}{m}} \qquad (3)$$

where $V_0$ is the potential drop from the starting point of the oscillations to the saddle point O and $y_0$ the distance of this starting point from O (that is, the amplitude of the oscillations).

In the case of an electron, $e = 4.8 \times 10^{-10}$ e.s.u.; $m = 9 \times 10^{-28}$ gm. Thus for an amplitude $y_0$ of 1 cm. and a potential drop $V_0$ of 3 e.s.u. (900 volts), the frequency of oscillation is $$f = 2.85 \times 10^8 \text{ c./s.} = 285 \text{ mc./s.}$$

In general the charged particles will leave their starting positions with "thermal" velocities corresponding to energies of a few electron volts and these velocities will have components parallel to the axis of the electrode system 1 and the outer electrode 2, that is, in a direction perpendicular to the plane of FIGURE 1. Since the apparatus has a finite axial length the axial drift of charged particles caused by such velocity components could result in an undesirable loss of charged particles through the ends of the outer conductor 2. To remedy this the ends of the outer electrode 2 are closed by respective conductive end plates (not shown) which are held at a suitable potential with respect to the outer electrode 2 of the same polarity as that of the charged particles (that is, negative where the charged particles are electrons). The distortion of the electrostatic field due to the presence of these end plates is negligible and does not appreciably effect the stability of the trajectories of the charged particles.

An outstanding feature of the oscillation generator according to the invention is its long time constant. For an oscillation frequency $f$ the time constant or "half-life" $t$ for the decay of simple harmonic oscillations of particles of charge $e$ due to radiative energy loss is:

$$t = \frac{3mc^2}{8\pi^2 f^2 e^2}$$

$$= \frac{3m^2c^3}{4e^3} \cdot \frac{y_0^2}{V_0} \text{ seconds}$$

where $c$ = velocity of light in vacuo.

Thus if the amplitude $y_o=1$ cm. (i.e. diameter of outer conductor $2=2$ cm.) and the potential difference $V_o$ between the outer conductor 2 and the saddle point O is 1000 volts, the time constant $$t = 4 \times 10^4 \text{ secs. approx.}$$
$$= 11 \text{ hours.}$$

This long time constant gives the oscillator a correspondingly high Q value; with the values quoted above, for example, Q is approximately $10^{13}$.

Collisions between the charged particles will cause some particles to be knocked out of stable trajectories. An upper limit therefore exists to the total population of charged particles. Approximate calculation shows that with $V_o=1000$ volts, $y_o=1$ cm. and a beam of electrons measuring 1 cm. x 1 mm. in cross section at its narrowest point the maximum number of electrons permitted if the "half life" $t$ of the electrons is to be $4 \times 10^4$ seconds is $10^5$ this life $t$ being inversely proportional to the number of electrons present. A limit is also set to the population of charged particles by the masking effect of the collective space charge due to the particles. This effect is greatest where the particle velocities are least, that is at distances of the order of $y_o$ from the saddle point O, since the space charge density is inversely proportional to the particle velocity. For example, if $V_o=1000$ volts, $y_o=1$ cm. and the charged particles comprise an electron beam with a width of 1 cm. in a direction perpendicular to the axes OX, OY then the total number of electrons present when the field due to their space charge just cancels the field $E_x$ at the point $x=0.025$ cm., $y=0.9$ cm. is approximately $4.5 \times 10^7$. The population limit set by particle collisions is seen to be lower than that set by the space charge effect.

Some applications of the invention are illustrated, as non-limitative examples, in FIGURES 2–5, where the same reference numerals and letters have been used for components corresponding to the basic arrangement of FIGURE 1.

In the vacuum gauge of FIGURE 2 a gas at a very low pressure, to be measured, is admitted to the space between the outer electrode 2 and the electrode system 1, thus reducing the mean free path of any oscillating electrons and thereby reducing the time constant $t$. A measure of the time constant $t$ will, therefore, give an indication of the pressure in the inter-electrode space.

It can be shown that the life of an oscillating electron is inversely proportional to the pressure. The vacuum gauge will be responsive to and will give appreciable indications of small changes in pressure provided the pressure is not so great that the time constant $t$ becomes too short for easy measurement. Thus an upper limit to the use of this method is a pressure of about $10^{-7}$ mm. Hg, at which the time constant is $10^{-3}$ sec.

A lower pressure limit has been found to exist also, due to energies lost by the electrons as a result of image currents etc., such lower limit being about $10^{-15}$ mm. Hg.

A measure of the pressure can be obtained by either of two methods ($a$) by measuring the ionisation current caused by ionising collisions between the electrons and molecules in the inter-electrode space or ($b$) by directly measuring the rate of loss of oscillatory electrons in said space. In the latter case a measure of the pressure is obtained by taking a measure of the time constant $t$.

It is found more practicable to use method ($a$) for pressure towards the above mentioned upper limit of the pressure range e.g. for pressure above about $10^{-8}$ mm. Hg and method ($b$) for pressures towards the lower limit of the range e.g. below about $10^{-8}$ mm. Hg.

In FIGURE 2, the voltage developed across an impedance Z connected between the electrode system 1 and earth is amplified in an amplifier 3 and measured by a detector 4. The impedance Z can be a resistance, an inductance or a tuned circuit. In one embodiment the voltage applied between the electrodes 1, 2 was approximately 1 kv., the impedance Z was about 1000 ohms., and the gain of amplifier 3 was approximately 100.

A measure of the voltage across the impedance Z will give an indication of the ionisation current for method ($a$) and an indication of the rate of electron loss for method ($b$). In method ($a$), however, electrons are constantly delivered at high density into the inter-electrode space in any suitable manner, while in method ($b$) a quantity of electrons are delivered into the inter-electrode space in the initial stages of measuring the pressure and a measure then taken of the rate at which electrons are lost from this initially delivered quantity.

It is desirable to avoid the occurrence of self-sustaining oscillations due to ionising collisions when the oscillator is used as a vacuum gauge. Accordingly the range of stable electron trajectories is severely restricted by suitably altering the electrode geometry, reducing the effective area of the outer electrode 2, or by selecting suitable electrode potentials. Thus, for example, the outer electrode may comprise two spaced apart cylindrical elements, the whole arrangement being housed in a metal container. Such an arrangement tends to make the oscillations of the electrons more nearly simple harmonic. The tendency for self-sustaining oscillations to occur can also be reduced by choosing a material for the outer electrode such that the material has a low efficiency for the emission of secondary electrons when struck by positive ions.

FIGURE 3 illustrates diagrammatically a mass spectrometer according to another application of the invention. For measurement of positive ions, electrode system 1 is made negative with respect to an outer electrode 2. Electrons are thermally emitted from the electrode system 1 and during their passage to the outer electrode 2 they produce positive ions by collision with gas molecules. These positive ions then proceed to oscillate with respect to the electrode system 1 in stable trajectories as described above; when a sufficiently large ion population has been achieved the electron current is switched off and the frequency of oscillation of the ions measured. For this purpose a low voltage (approximately 10 volts r.m.s.) variable frequency oscillator 5 is connected to electrode system 1 so as to superimpose an oscillatory signal on the static potential applied thereto. The frequency of the oscillator 5, which is conveniently variable in the range 1–100 mc./s., is adjusted until it coincides with the ion oscillation frequency, when maximum bunching of the ions will occur, giving rise to an enhanced signal across the impedance Z, said signal being detected by the detector 4 in the same manner as in the vacuum gauge of FIGURE 2. The detector 4 could be similar to that employed with the vacuum gauge of FIGURE 2, but it is preferred to employ a phase sensitive detector locked to the oscillator 5.

Measurement of the frequency of oscillation in this way gives an indication of the mass of the oscillating ions, since the oscillation frequency is proportional to the square root of the charge to mass ratio ($e/m$) of the ions. The mass spectrum can be scanned either by varying the frequency of oscillator 5 as described or by maintaining this frequency fixed and varying the electrostatic voltage applied between the electrode system and the outer electrode 2. The ions instead of being formed in situ could, of course, be introduced from an auxiliary (external) ion source. Clearly if negative ions are to be studied the polarities of the applied electrostatic potentials would be reversed.

The application of the oscillation generator as a vacuum pump is illustrated in FIGURE 4. The production of ions is in this case enhanced by forming the outer electrode 2 of gettering material such as titanium, and enclosing the outer electrode 2 in a cylindrical collector electrode 6, said collector electrode 6 being earthed and the outer electrode 2 being held at a high negative potential (e.g. −5000 volts) with respect to earth. The outer electrode 2 is provided with a number of louvres 7 and the electrode system 1 being maintained at a relatively low positive potential (e.g. 500 volts). Positive ions formed by the collision of electrons with gas molecules are accelerated towards the outer electrode 2. Ions which collide with the electrode 2 eject titanium atoms and these in turn settle on all the electrodes including the collector electrode 6 the freshly sputtered titanium deposit thereon assisting in the ion capture process. The electrode potentials are such that positive ions which pass through the louvres 7 reach the collector electrode 6 with sufficient energy for burial in the titanium but with insufficient energy for the ejection of titanium atoms.

The discharge in the vacuum pump will be self-sustaining if at each ionising collision at least one electron goes into a stable trajectory.

Such self-sustaining operation can be enhanced by making both the outer electrode 2 and the collector electrode 6 of a suitable gettering material, and preferably a material which promotes the secondary emission of electrons by ionic collisions therewith, a suitable material being titanium. Self-sustaining operation can also be encouraged by suitable distortion of the outer electrode 2 and collector electrode 6, as shown in FIGURE 4a.

A practical embodiment of a vacuum pump incorporating the invention is illustrated in FIGURES 5 to 9. An electrostatic oscillator constructed in accordance with FIGURE 1 comprises an outer open-ended cylindrical copper shell 20 provided at each end with four axially extending pillars 21. Mounted on the outer ends of each respective pair of pillars 21 and spaced somewhat from the adjacent open end of the shell 20 are respective circular support plates 23, 24 of insulating material, e.g. glass, disposed in a radial plane perpendicular to the longitudinal axis of the shell 20.

A pair of parallel wires 25, 25', comprised by lengths of .002" diam. tungsten wire, extend in an axial direction within the shell 20 between the support plates 23, 24.

Each wire 25, 25' has one end 26, 26' anchored to a metal block 27 by being wrapped around the shank of a screw 28, 28', tightened down into a tapped hole in said block 27. The block 27 is secured to the outer face of the respective support plate 23. The wires 25, 25' pass through holes 29, 29' in the block 27 through clearance holes 31, 31' in the support plate 23 through the cylindrical outer electrode 20 to tension springs 32, 32' which are secured to the other ends of the wires 25, 25'. The springs 32, 32' pass through clearance holes 33, 33' in the support plate 24 and are hooked around respective crosspieces 34, 34' (FIGURE 9) which extend transversely across a slot 35 in a rectangular metal block 36 secured to the outer face of the support plate 24, The crosspieces 34, 34' are held in position by friction and by the force exerted by the tension in the springs 32, 32'. The spring tension also serves, of course, to hold the wires 25, 25' taut.

The wires 25, 25' extend in a common diametral longitudinal plane through cylindrical shell 20 on opposite sides of and equispaced from the longitudinal axis of said shell 20.

The wires 25, 25' form the positive electrode pair of an electrode system of which the negative electrode is provided by a cylindrical cathode 37 of titanium held coaxially within the cylindrical shell 20 by two sets of three equiangularly spaced, radially extending, adjustment screws 40. The screws 40 engage the outer surface of the cathode 37 near its ends and can be screwed in and out through screw-threaded holes in the shell 20 to adjust the position of the cathode 37 within the shell 20 so that it is accurately coaxial therewith.

To obtain parallelism between the wires 25, 25' and the common axis of shell 20 and cathode 37 the position of the cross pieces 34, 34' on which the tension springs 32, 32' are hooked can be adjusted. The equal spacing between the wires 25, 25' and said axis is set by the spacing and positioning of the holes 29 in the block 27.

The ends of the cylindrical cathode 37 are closed by electrically conductive circular discs 38, each of which is split diametrically in the plane of the wires 25, 25' to form semi-circular parts 38a, 38b (FIGURE 7). Each part 38a, 38b has semi-circular notches 39 cut in its diametral edge which co-operate with corresponding notches in the other part to form a pair of clearance apertures through which the wires 25, 25' pass.

Each of the discs 38 also has a ring of equiangularly spaced holes 41 arranged at 30° spacing for the purpose of allowing free flow of gas molecules into and out of the interior of the cylindrical cathode 37.

When in use as a vacuum pump the apparatus described above is wholly immersed in the space to be evacuated, or may be positioned within an open-ended housing sealed fast to a boundary wall of said space with its open end fitting over an aperture in the wall through which communication is established between the interior of the housing and the space. The apparatus is then made so that one end of the apparatus protrudes through the aperture into the space.

During pumping, a suitable potential to be placed across the electrode system, that is, between the wires 25, 25' and the cathode 37, is between 5 and 10 kv.

In a modification the cylindrical cathode 37 may be omitted and the shell 20, which in this case is made of titanium rather than copper, is used as a cathode.

The wires 25, 25' themselves are preferably made of titanium so that when an appreciable electron current occurs and the wires get hot, titanium is evaporated to provide, when it condenses on the cathode 37, a fresh titanium surface on which positive ions can be trapped.

The apparatus of FIGURES 5 to 7 may be provided with a source of electrons for initiating the pumping effect. One such source comprises an indirectly heated electron-emitting surface situated close to and electrically connected with the cathode 37, so as to adopt its potential. The electron-emitting surface is made so as to screen the heater filaments used to heat it and so prevent, or at least reduce to a minimum, any distortion of the electrostatic field within the cylindrical cathode 37 as a result of heating current flow.

Figure 10:
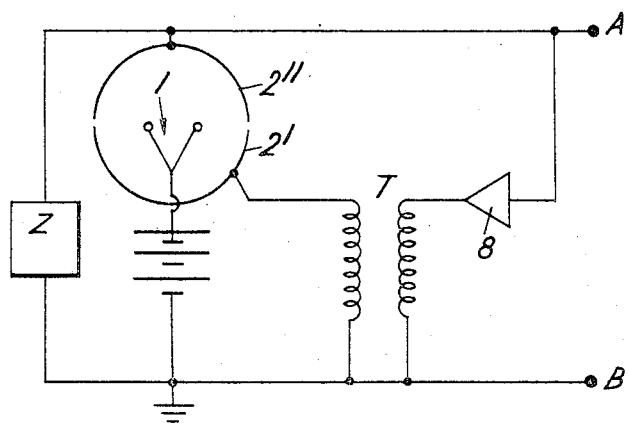
FIGURES 10 and 11 are diagrammatic representations of two forms of coherent oscillator embodying the invention.

Although the oscillation generator as described above is essentially a noise generator, it can be made to produce a signal which is largely noise free by the provision of positive feedback. As illustrated in FIGURE 10 an oscillator of the type herein described has a split outer electrode 2', 2", the two halves 2', 2" of which are insulated from each other, for example by means of a glass separator. One half 2' is connected to receive the output of a tuned amplifier 8 which amplifies the voltage developed across an impedance Z, said impedance Z being connected to the other half 2" of the outer electrode whereby a signal in the appropriate phase to produce oscillation is fed back to the half 2' through a transformer T.

The oscillatory output is taken at terminals A, B across the impedance Z.

Alternatively, a coherent oscillator may be formed with an integral outer electrode 2, having a similar construction as the vacuum gauge of FIGURE 2. Such an arrangement is shown diagrammatically in FIGURE 11, in which the same references are used as in FIGURE 10.

Figure 11:
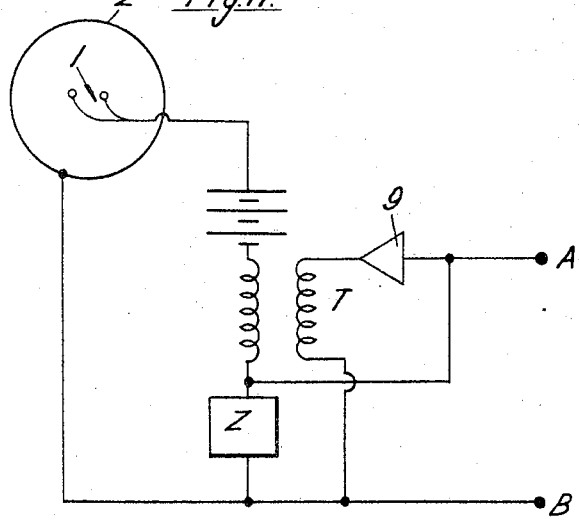

In practical embodiments of the coherent oscillators of FIGURES 10 and 11, the impedance Z, which can be a resistance, an inductance or a tuned circuit, had a value of about 1000 ohms, the amplifier 9 a gain of 100 with negative feedback, and the transformer T a step-up ratio of 10:1. The voltage applied between the electrode system 1 and the outer electrode 2 depends on the oscillation frequency required: the frequency is proportional to the square root of the applied voltage. The split electrode arrangement of FIGURE 10 oscillates at half the frequency of the arrangement of FIGURE 11 for a given applied voltage. Thus for an applied voltage of 1 kv. the arrangement of FIGURE 10 has an oscillation frequency $2 \times 10^9$ c./s. while that of FIGURE 11 has an oscillation frequency of $4 \times 10^9$ c./s.

When the oscillation generator is used as a coherent oscillator, for example, it would be advantageous to have the charged particles performing simple harmonic motion. This could be arranged by suitably modifying the shape of the outer electrode 2, but such modification is undesirable as it would lead to a reduction in the range of stable trajectories and hence to a reduction in the number of charged particles present. The application of a magnetic field parallel to the y-axis (FIGURE 1) would, however, probably have the effect of checking such reduction in the number of charged particles by constraining the particles to move in a narrow region close to the plane containing the y-axis and the axis of symmetry.

Further applications envisaged for the oscillation generator of the invention include use as a charged particle reactor for the study of reactions between charged particles of like sign, in the absence of charged particles of opposite sign. If the reactions are made to occur within the space enclosed by the outer electrode 2, charged particles of opposite sign to those under observation are automatically driven to the wall of the outer electrode 2, and hence confusing effects due to their presence are avoided. Thus with an oscillator having an outer electrode 1 cm. in diameter and an applied voltage of 1 kv. it should be possible to maintain charged particles of like sign within the outer electrode up to densities of $10^9$ particles/cc. This particle density should be sufficiently high for the observation of certain reactions, and the reaction rate would then be of the order of $10^8$ events/cc./sec.

When the electrode system 1 comprises two cylindrical conductors, the mounting of the system, and the provision of electrical connections thereto, presents little difficulty, as the conductors pass through the ends of the outer electrode 2. When, however, the electrode system 1 comprises two spaced apart spherical conductors or a single annular conductor, a problem arises in supporting the electrode system and making electrical contact thereto without distorting the electrostatic field configuration appreciably. One possible solution to this problem is to coat the wires which provide the electrical connection to the electrode system 1 with an insulating material. In operation, a surface charge then accumulates on the insulating material, this charge building up until the field due to the respective wire is cancelled by the field due to the surface charge, the wire in question being located in a region of the field where charge does not normally flow. In the case of an annular conductor, this may be formed, in effect, by coating a conducting annular plate with insulating material and then removing the insulating coating only from the internal edge of the central hole. Such an electrode system has the advantages of good mechanical rigidity, good heat dissipation properties, and dimensions which can be controlled accurately.

I claim:

1. A vacuum gauge including a vacuum chamber and having a charged particle transit time oscillator comprising:
   a vessel in which the pressure is to be measured connected to said vacuum chamber;
   an outer electrode in said chamber;
   means operatively associated with said outer electrode for introducing charged particles internally thereof;
   a pair of spaced conductors mounted within said outer electrode and surrounded thereby;
   detector means operatively associated with said conductor and said electrode for detecting electrical oscillations of charged particles;
   means operatively associated with said oscillator for determining said pressure in terms of the decay time of oscillation of the oscillator;
   means for applying a common electrostatic potential to said pair of conductors;
   said potential having a polarity with respect to the outer electrode opposite to the polarity of the charged particles;
   the pair of conductors and the means for introducing charged particles internally of said outer electrode being positioned so that the applied electrostatic potential provides a solely electrostatic field which has a pronounced single saddle configuration in the region of the pair of conductors and providing an electrostatic force on the charged particles in said chamber, said force being directed towards a region of a plane passing through the space between the conductors;
   said region of the plane being substantially outside the region of the single saddle configuration whereby the charged particles in said chamber follow stable paths of oscillatory movement through said electrostatic field without the presence of an artificially induced magnetic field within said chamber.

2. A vacuum gauge according to claim 1 in which the said electrostatic field of the pair of conductors has field lines which are directed substantially radially towards the centre of the saddle configuration at positions beyond a relatively short distance therefrom.

3. A vacuum gauge as claimed in claim 1 in which said conductors comprise parallel, substantially cylindrical, members.

4. A vacuum gauge as claimed in claim 1 in which the pair of conductors is centrally disposed within the outer electrode.

5. A vacuum gauge as claimed in claim 4 in which the outer electrode is spaced from the pair of conductors by a distance which is large compared with the distance of the centre of the saddle configuration from the pair of conductors.

6. A vacuum gauge as claimed in claim 5 in which the outer electrode has a shape which conforms to an equipotential surface of the electrostatic field which would exist were the pair of conductors charged and remote from all other objects.

7. A vacuum gauge as claimed in claim 6 in which the outer electrode comprises a hollow cylinder having at each end respective conductive end plates which are held at a constant potential with respect to the outer electrode of the same polarity as the polarity of the charged particles.

8. A vacuum gauge as claimed in claim 4 in which the outer electrode comprises a plurality of equal segments which are electrically insulated from each other.

9. A vacuum gauge as claimed in claim 1 in which a cylindrical outer electrode is provided and tuned amplifier means are connected to amplify the voltage between the pair of conductors and the outer electrode.

10. A vacuum gauge as claimed in claim 1 having a divided cylindrical outer electrode having two halves surrounding the pair of conductors concentrically.

11. A gauge as claimed in claim 1 in which the oscillator comprises:
    a cylindrical outer electrode,
    said pair of conductors being located close to and parallel to the axis of said outer electrode.
    means applying a positive potential to the pair of conductors relative to the outer electrode,
    said particles being electrons,
    said means for determining said pressure including means for amplifying the voltage produced across an impedance connected between said pair of conductors and earth, whereby to ascertain the degree of vacuum in the said chamber by detecting the output of said amplifier means.

12. Mass spectrometer apparatus having a vacuum chamber and a particle transit time oscillator therein and comprising:
    a cylindrical outer electrode in said chamber;
    a pair of parallel spaced conductors extending axially therewithin and surrounded by said outer electrode;
    means operatively associated with said outer electrode for introducing charged particles internally of said outer electrode wherein said particles produce ions from gas molecules therein;

an alternating source of potential difference of variable frequency connected between the outer electrode and earth for scanning the mass spectrum;

an impedance connected between the pair of conductors and earth;

means for amplifying and detecting the voltage produced across said impedance indicative of the frequency of electrical oscillations of said ions and of the mass of said oscillating ions; and means for applying a common electrostatic potential to said pair of conductors;

said potential having a polarity with respect to the outer electrode opposite to the polarity of the ions;

the pair of conductors and the means for introducing charged particles internally of said outer electrode being positioned so that the applied electrostatic potentials provide a solely electrostatic field which has a pronounced single saddle configuration in the region of the pair of conductors and providing an electrostatic force on the ions in said chamber, said force being directed towards a region of a plane passing through the space between conductors;

said region of the plane being substantially outside the region of the single saddle configuration whereby the ions in said chamber follow stable paths of oscillatory movement through said electrostatic field without the presence of an artificially induced magnetic field within said chamber.

13. A mass spectrometer according to claim 12 in which the said electrostatic field of the pair of conductors has field lines which are directed substantially radially towards the center of the saddle configuration at positions beyond a relatively short distance therefrom.

14. A mass spectrometer as claimed in claim 12 in which said conductors comprise parallel, substantially cylindrical members.

15. A mass spectrometer as claimed in claim 12 in which the pair of conductors are centrally disposed within the outer electrode.

16. A mass spectrometer as claimed in claim 15 in which the outer electrode is spaced from the pair of conductors by a distance which is large compared with the distance of the center of the saddle configuration from the pair of conductors.

17. A mass spectrometer as claimed in claim 16 in which the outer electrode has a shape which conforms to an equi-potential surface of electrostatic field which would exist were the pair of conductors charged in remote from all other objects.

18. A mass spectrometer as claimed in claim 17 in which the outer electrode comprises a hollow cylinder having at each end respective conductive end plates which are held in a constant potential with respect to the outer electrode of the same polarity as the polarity of the ions.

19. A mass spectrometer as claimed in claim 12 in which tuned amplifier means are connected to amplify the voltage between the pair of conductors and the outer electrode.

20. Mass spectrometer apparatus having a charged particle transit time oscillator and a vacuum chamber and comprising:

a cylindrical outer electrode in said chamber;

a pair of parallel spaced conductors extending axially therewithin and surrounded by said outer electrode;

means operatively associated with said outer electrode for introducing charged particles internally of said outer electrode wherein said particles produce ions from gas molecules therein;

an alternating source of potential difference and variable frequency connected between the outer electrode and earth said frequency being variable to coincide with the ion oscillation frequency to scan the mass spectrum;

an impedance connected between the pair of conductors and earth;

means for amplifying and detecting the voltage produced across said impedance indicative of the frequency of electrical oscillation of said ions and of the mass of said oscillating ions; and means operatively associated for applying a common electrostatic potential to said pair of conductors;

said potential having a polarity with respect to the outer electrode opposite to the polarity of the ions;

the pair of conductors and the means for introducing charged particles internally of said outer electrode being positioned so that the applied electrostatic potentials provide a solely electrostatic field which has a pronounced single saddle configuration in the region of the pair of conductors and providing an electrostatic force on the ions in said chamber, said force being directed towards a region of a plane passing through the space between the conductors;

said region of the plane being substantially outside the region of the single saddle configuration whereby the ions in said chamber follow stable paths of oscillatory movement through said electrostatic field without the presence of an artificially induced magnetic field within said chamber.

21. A charged particle analyzer having a vacuum chamber and a charged particle transit time oscillator therein, said analyzer comprising:

a cylindrical outer electrode in said chamber;

a pair of parallel spaced conductors extending axially therewithin and surrounded by said outer electrode;

means for producing charged particles internally of said outer electrode;

means for applying a common electrostatic potential to said pair of conductors;

said potential having a polarity with respect to the outer electrode opposite to the polarity of the charged particles;

the pair of conductors and the means for introducing charged particles internally of said outer electrode being positioned so that the applied electrostatic potentials provide a solely electrostatic field which has a pronounced single saddle configuration in the region of the pair of conductors and providing an electrostatic force on the charged particles in said chamber, said force being directed towards a region of a plane passing through the space between said conductors;

said region of the plane being substantially outside the region of the single saddle configuration whereby the charged particles in said chamber follow stable paths of oscillatory movement through said electrostatic field without the presence of an artificially induced magnetic field within said chamber;

an impedance connected between the pair of conductors and earth; and means for amplifying and detecting the voltage produced across said impedance indicative of the electrical oscillations of selected charged particles.

22. The charged particle analyzer according to claim 21 wherein the detector output indicates the pressure level within said chamber in terms of the decay time of oscillation of the oscillator and further comprises means for connecting said chamber to a chamber in which the pressure is to be measured.

23. The charged particle analyzer according to claim 21 wherein the means for producing charged particles produces ions from gas molecules; the detector means is responsive to frequency of ion oscillation as an indication of ion mass; and an alternating source of potential difference of variable frequency is connected between the outer electrode and earth for scanning the mass spectrum.

(References on following page)

References Cited

UNITED STATES PATENTS

| | | | |
|---|---|---|---|
| 2,033,937 | 3/1936 | Hollmann | 331—92 X |
| 2,163,756 | 6/1939 | Llwellyn | 331—92 |
| 2,342,263 | 2/1944 | Fremlin | 331—92 X |
| 3,244,969 | 4/1966 | Herb et al. | 324—33 |
| 3,280,326 | 10/1966 | Gunther | 250—41.9 |

WILLIAM F. LINDQUIST, Primary Examiner

U.S. Cl. X.R.

230—69; 331—92; 324—33